UNITED STATES PATENT OFFICE.

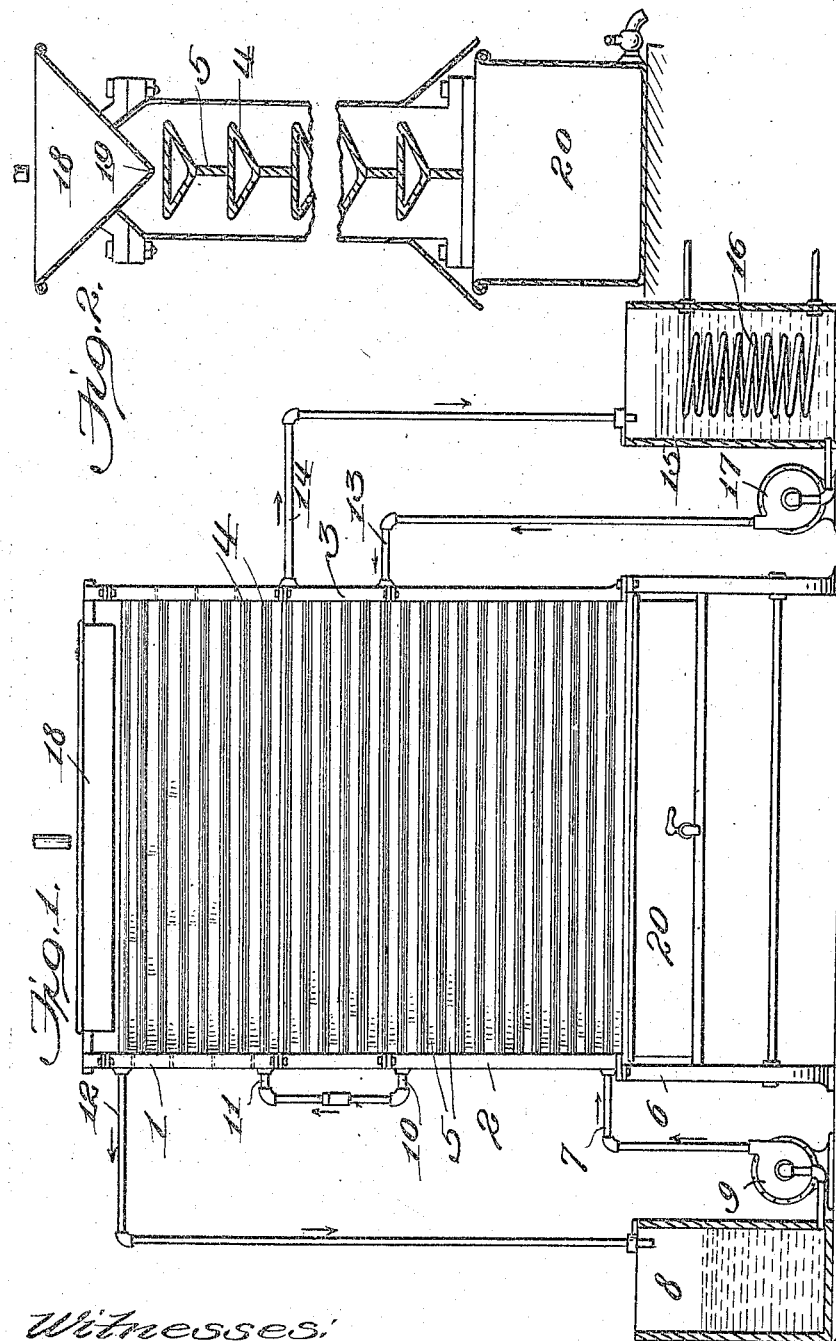

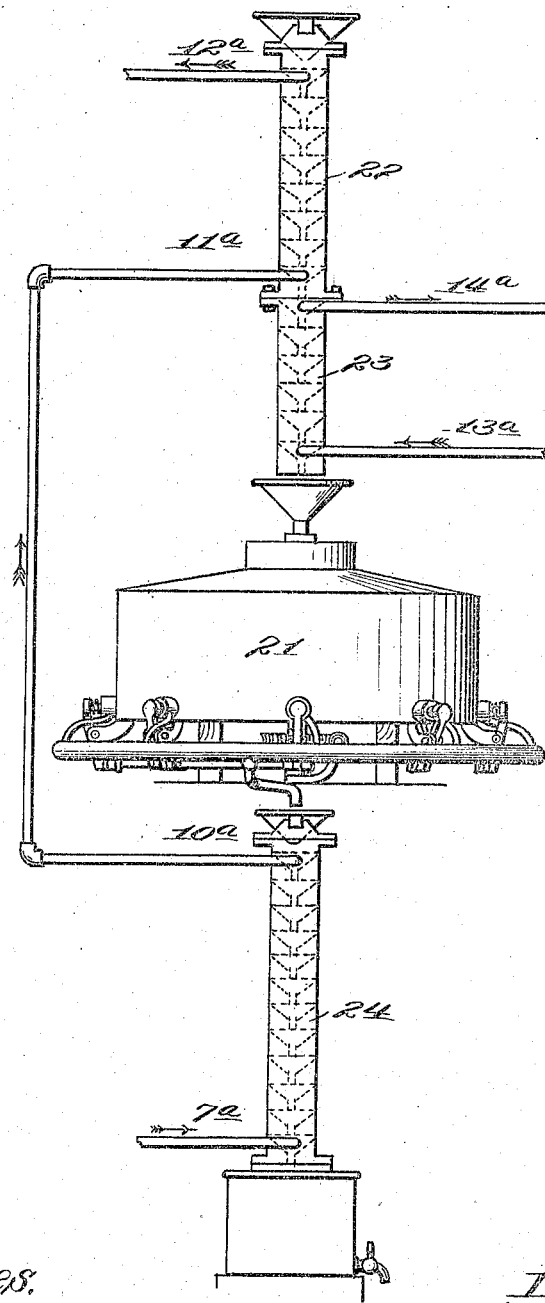

JOSEPH WILLMANN, OF DERBY, CONNECTICUT.

PASTEURIZING AND COOLING PROCESS.

No. 930,910.  Specification of Letters Patent.  Patented Aug. 10, 1909.

Application filed April 9, 1909. Serial No. 488,926.

*To all whom it may concern:*

Be it known that I, JOSEPH WILLMANN, a subject of the Emperor of Germany, residing at Derby, in the county of New Haven and State of Connecticut, have invented new and useful Improvements in Pasteurizing and Cooling Processes, of which the following is a specification.

My present invention relates to improvements in the pasteurization of liquids and particularly milk, and it has for its object primarily to provide an improved process of pasteurizing and cooling such liquids whereby a relatively high efficiency is obtainable, and a large amount of liquid may be treated in a given time by the use of a relatively small amount of heat and a small quantity of cooling medium, the liquid to be treated and the cooling medium being caused to flow in opposite directions and under the influence of one another, and the liquid to be treated is heated to the pasteurizing temperature at a certain point in the path of flow so that the cooling medium which has become heated owing to its absorption of the heat of the liquid under treatment after being heated to the pasteurizing temperature serves to initially or preliminarily warm the fresh or inflowing liquid to approximately the pasteurizing temperature and, in doing so, the temperature of the cooling medium is lowered correspondingly.

The present process relates more especially to one wherein the milk or other liquid to be treated may flow continuously or uninterruptedly during its treatment so that a large quantity of the liquid may be treated in a short time and an economy is effected in the amount of heat required to raise the temperature of the liquid under treatment to the pasteurizing temperature, this being accomplished essentially by causing the cooling medium to give up its heat to the inflowing or fresh liquid that it absorbed in cooling the milk or liquid after it has been maintained for a proper length of time at the pasteurizing temperature, it being preferable in the handling of milk to so conduct the process as to maintain it at such a temperature and for a period of time that is sufficient to kill or render harmless the pathogenic organisms, but insufficient to coagulate the albuminoids in the milk so that the natural characteristics of the milk would not be impaired or destroyed.

In carrying the invention into effect, apparatus of various kinds can be used, the drawing showing as an example one form of apparatus that may be used advantageously in performing the process. It will also be understood that certain modifications can be made in the process itself to meet different requirements, and I shall describe what I now consider the preferred process.

In the accompanying drawing: Figure 1 is a diagrammatic view of one form of apparatus that can be used in carrying the process into operation; and Fig. 2 represents a vertical section through the main element of the apparatus showing the construction of the tubes which provide the surfaces through which the interchanges in temperature between the milk or liquid to be treated and the cooling medium may take place. Fig. 3 is a diagrammatic view showing the apparatus used in connection with a holding device for insuring a prolonged treatment of the milk or liquid.

I shall first describe the construction of that form of apparatus shown and the manner of performing the process will then be described.

The apparatus shown comprises generally an upper or forewarming section 1, a lower or cooling section 2 and an intermediate or heating section 3 all of which sections may be of any suitable or desirable construction. Those shown are built up of units, each having headers at the opposite ends and tubes 4 which extend preferably horizontally between the headers and are arranged in superposed relation so that a liquid may flow downwardly by gravity and over their external surfaces. In order to provide a maximum surface for each tube, a tube of approximately triangular form may be used as shown in Fig. 2, the upper side of each tube being arranged preferably horizontally and of relatively large area and the two lower sides may be inclined toward the center of the tube, and it may be preferable to interpose between the tubes division strips 5 whereby a stream of liquid pouring over each tube is divided into two paths, thus insuring a uniform and thorough exposure of the liquid to the surfaces of the tubes. These tubes are suitably connected to the headers at the opposite ends of each section and suitable means is provided whereby a liquid flowing through the tubes is caused to traverse the tubes successively. In the apparatus shown, the three sections are made of separate units and are suitably bolted together in superposed relation, the spaces between the heaters of one section being separated from the spaces between the heaters of the adjacent section or sections. The units thus built up may be supported upon a suitable base 6.

The lower section 2 may be designated in the present instance a cooling section and it is provided with an inlet pipe 7 which is preferably arranged at or in proximity to its bottom which pipe is adapted to introduce an appropriate cooling medium into the apparatus. When available, well water may be used economically. In the present instance, I have shown as an example a brine tank 8 having a circulating pump 9 by means of which the cooling medium is caused to enter the bottom of the cooling section. An outlet pipe 10 leads from the cooling section preferably at or in proximity to the top thereof, and this outlet pipe for the cooling section connects directly with an inlet pipe 11 for the forewarming section 1, this inlet pipe entering preferably at the bottom of this forewarming upper section, and an outlet pipe 12 leads from the forewarming section preferably at the top thereof and serves to return the cooling medium in the present instance to the receptacle 8. However, in using well or other water of the proper temperature, it may not be desirable in such cases to again use it after its discharge from the forewarming section. The intermediate section 3 in the present instance is the heater through which a heating medium circulates that is preferably at a temperature that will effect the pasteurization of the milk or liquid when the same is exposed for an appropriate length of time, and in the pasteurization of milk, I prefer to expose it at such a temperature and for such a period of time as will be sufficient to kill or render harmless the pathogenic organisms but insufficient to coagulate the albuminoids or to otherwise impair or destroy the characteristics of the milk. I have shown for convenience an apparatus for supplying water heated to the appropriate temperature to the heater, inlet and outlet pipes 13 and 14 being connected preferably to the bottom and top respectively of the heating section, the inlet pipe leading from a hot water heater 15 which may contain a steam heating coil 16, a pump 17 being shown that may be used if desirable to insure a proper circulation of the hot water as a heating medium.

In practice, the milk or liquid to be pasteurized is preferably caused to flow over the exterior of the tubes. In the present instance, I have shown an apparatus wherein the milk or liquid to be pasteurized is caused to flow over the exterior of the tubes and the circulating or cooling medium flows through the tubes. For convenience, I have shown a trough or gutter 18 which is mounted at the top of the upper section 1 in an appropriate manner and in this instance, the bottom of the trough or gutter is inclined so as to reach an apex which is provided with a row of perforations 19 or a slot to form an outlet opening whereby the milk or liquid to be pasteurized may be discharged over the center of the vertical row of tubes, the milk or liquid to be pasteurized being conducted to this trough or gutter by any suitable means such, for instance, as by a pipe as indicated conventionally in the drawing. Any suitable means may be provided for collecting the milk or liquid after it has been treated, a tank 20 being shown in the present instance which is supported on the base 6 and below the vertical row of superposed tubes whereby such tank may receive the milk or liquid after it has flowed over the tubes.

In practice, the milk or liquid to be pasteurized is conveyed to the trough or gutter 18 from which it discharges through the outlet 19 therein to the uppermost tube in the forewarmer 1, the stream or streams of the milk or liquid being divided and thence flowing outwardly over the upper surface of the top of the tube and then flowing under the tube whereupon it reaches the next lower tube, and this flow of the milk or liquid under treatment continues until it is finally discharged into the collecting tank 20. The water or heating medium is caused to circulate through the tubes of the intermediate or heating section 3, while the cooling medium is caused to enter the bottom of the cooling section 2 and after passing back and forth through the tubes thereof, it passes through the outlet 10, it bridges the heating section and then enters the bottom of the upper or forewarming section, and after passing through the tubes in the latter section, it discharges from the top thereof. The milk or liquid in flowing over the tubes of the intermediate or heating section will be maintained at the proper pasteurizing temperature owing to the influence of the heating medium that circulates through the tubes of this section. This milk upon leaving the heating section reaches the tubes of the lower or cooling section through the tubes of which circulates the cooling medium. The milk or liquid in flowing from one tube of the section to the next tube and so on toward the collecting tank is progressively cooled by giving up its heat to the circulating medium and at the time the milk or liquid after treatment reaches the collecting tank, its temperature will have been reduced to approximately the temperature of the cooling medium as it enters the bottom of the cooling section. Owing, however, to the absorption of the heat of the milk or liquid under treatment by the cooling medium, it will be obvious that the temperature of the cooling medium as it flows toward the top of the cooling section will be raised until its temperature is approximately that of the pasteurizing temperature of the milk or liquid at the time it leaves the heating section. This cooling medium at the relatively high temperature then enters the forewarming section, it preferably entering at the bottom thereof, and as this cooling medium heated to such a temperature circulates through the tubes and rises in the forewarming section, it will give up its heat to the incoming milk or liquid. This incoming milk or liquid is gradually increased in temperature as it descends until it encounters the cooling medium which enters the bottom of the section 1 at a relatively high temperature, the milk absorbing sufficient heat from the cooling medium to raise the temperature of the latter approximately to the pasteurizing point, and on the other hand, the circulation of the cooling medium toward the top of the section 1 will cause the heat thereof to be absorbed by the incoming milk or liquid which enters the apparatus preferably at a relatively low temperature and hence the cooling medium will discharge from the top of the forewarming section at a relatively low temperature.

Obviously, the relative proportions of the several sections of the apparatus and the areas with which the milk or liquid to be treated and the cooling medium come in contact may be such that the milk or liquid may discharge from the apparatus at the same temperature as that of the cooling medium which enters the apparatus, and the cooling medium which discharges from the apparatus may have substantially the same temperature as that of the milk or liquid entering the apparatus.

In some cases, in order to insure a perfect pasteurization of the milk or liquid without, however, coagulating albuminous matter, a holding device may be interposed between the heating and cooling sections similar to that disclosed in Letters Patent, No. 913,600 granted to me on Feb. 23, 1909 in which case the milk or liquid after being heated by the section 3 would be held or maintained at such a temperature and for such a period of time as will be sufficient to kill or render harmless the pathogenic organisms without, however, coagulating albuminous matter.

Fig. 3 shows diagrammatically an example of an apparatus wherein a holding device is interposed between the heating and cooling sections, 21 indicating generally a holding device which, for instance, may be such as that disclosed in my prior patent aforesaid wherein the milk after being heated to an appropriate pasteurizing temperature may be held or maintained uniformly at such temperature for a prolonged period sufficient to kill or render harmless the pathogenic organisms without coagulating the albuminous matter or destroying the cream line. In this instance 22 designates generally the forewarmer and 23 the heating section, while 24 designates the cooling section which is placed so as to receive the milk from the holding device. In this arrangement, the milk may be supplied to and received from the apparatus in the same manner as described in connection with Figs. 1 and 2 and the heating and cooling mediums may be supplied to the apparatus in the same manner, $13^a$ and $14^a$ indicating the outlet for the heating medium, $7^a$ and $12^a$ indicating the inlet and outlet for the cooling medium, and $10^a$ and $11^a$ designating the pipes or conductors which convey the circulating or cooling medium from the cooling section to the forewarming section.

According to the present process, a relatively high efficiency in the pasteurization of milk, cream and similar liquids may be obtained owing to the interchanging of heat between the liquid under treatment and the circulating or cooling medium, and in such cases where the temperature of the liquid entering the apparatus is sufficiently low, the same circulating or cooling medium may be used repeatedly. Moreover, the parts of the apparatus may be so proportioned that, say, one pound of the cooling medium would be capable of cooling one pound of the liquid under treatment. For instance, well water could be used that enters the apparatus at, say, 58° F. and cools the liquid leaving the heater at, say, 158° F., the cooling medium in that case leaving the cooler at, say, 156 or 157° F. while the milk or other liquid under treatment leaves the cooler at, say, 58° or 59° F. The cooling medium leaving the cooler at, say, 157° would then enter the forewarmer and while passing therethrough would heat the liquid entering at, say, 55° F. to say, 154° F. and the cooling medium in turn would be cooled by the entering liquid and would leave the forewarmer at a temperature of, say, 58° F. The above is given, however, merely as one example of the process, but it will be obvious therefrom that the process is economical and, moreover, the milk or liquid may flow continuously during the initial or preliminary warming, heating and cooling so that the process is well adapted for the commercial pasteurization of milk and cream, the original characteristics of which are preserved.

I claim as my invention:

1. A process of pasteurizing milk which consists in subjecting a flowing body of milk to the action of a heating medium and also to the action of a cooling medium which latter medium absorbs heat from the milk after being heated and transmits the heat thus absorbed to the milk before the latter is acted on by said heating medium.

2. A process of pasteurizing milk which consists in creating a flow of the milk in one direction and causing the flow of a cooling medium in an opposite direction, the milk and cooling medium being under the mutual influence of one another, and applying heat to the milk after the latter has been preliminarily warmed by the cooling medium and before it has been cooled by the latter.

3. A process of pasteurizing milk which consists in creating a flow of a body of milk in one direction and applying heat to a portion of said body, and producing a flow of a cooling medium in an opposite direction, the cooling medium acting on the body of milk first after it has been acted on by the heating medium whereby the milk will be cooled and then before the milk has been acted on by the heating medium whereby the heat absorbed by the cooling medium will be transmitted to the milk before being acted on by the heating medium.

4. A process of pasteurizing liquids which consists in applying heat to a portion of a flowing body of the liquid, and subjecting the said body of liquid to the influence of a medium which first acts to cool said liquid after being heated, and then acts to warm said body of liquid before being heated.

5. A process of pasteurizing milk and similar liquids which consists in applying heat to a flowing body of the liquid, and subjecting the said liquid to the influence of a cooling medium which first acts upon the liquid after being heated to cool it and subsequently acts upon the liquid before being heated, the cooling medium transmitting its heat to such liquid to increase its temperature preliminarily to the heating of such liquid.

6. A process of pasteurizing liquids which consists in heating a portion of a flowing body of the liquid to a pasteurizing temperature, and subjecting said body of liquid to the influence of a cooling medium which first acts upon the said liquid after being heated to cool it and subsequently acts on the liquid before being heated to the pasteurizing temperature, the heat absorbed by the cooling medium being transmitted to the liquid to preliminarily warm it.

7. A process of pasteurizing liquids which consists in applying heat to a flowing body of the liquid, and subjecting said liquid to the influence of a circulating medium which transfers heat from the liquid after being heated to the liquid before it is heated.

8. A process of pasteurizing liquids which consists in heating a flowing body of the liquid to a pasteurizing temperature, and warming the liquid before said heating and cooling it after such heating by the influence of a circulating liquid.

9. A process of pasteurizing liquids which consists in heating a flowing body of liquid to a pasteurizing temperature, subjecting said liquid after such heating to the influence of a circulating medium which absorbs the heat of such liquid, and then causing the circulating medium thus heated to act on said liquid before the said heating thereof whereby its temperature is increased preliminarily to said heating.

In testimony whereof I have hereunto set my hand in presence of two subscribing witnesses.

JOSEPH WILLMANN.

Witnesses:
EDWARD L. BARNES,
D. N. CLARK.